Dec. 23, 1958   C. S. WARNER   2,865,251
FOLDING OPERA GLASS SPECTACLES
Filed Nov. 1, 1955
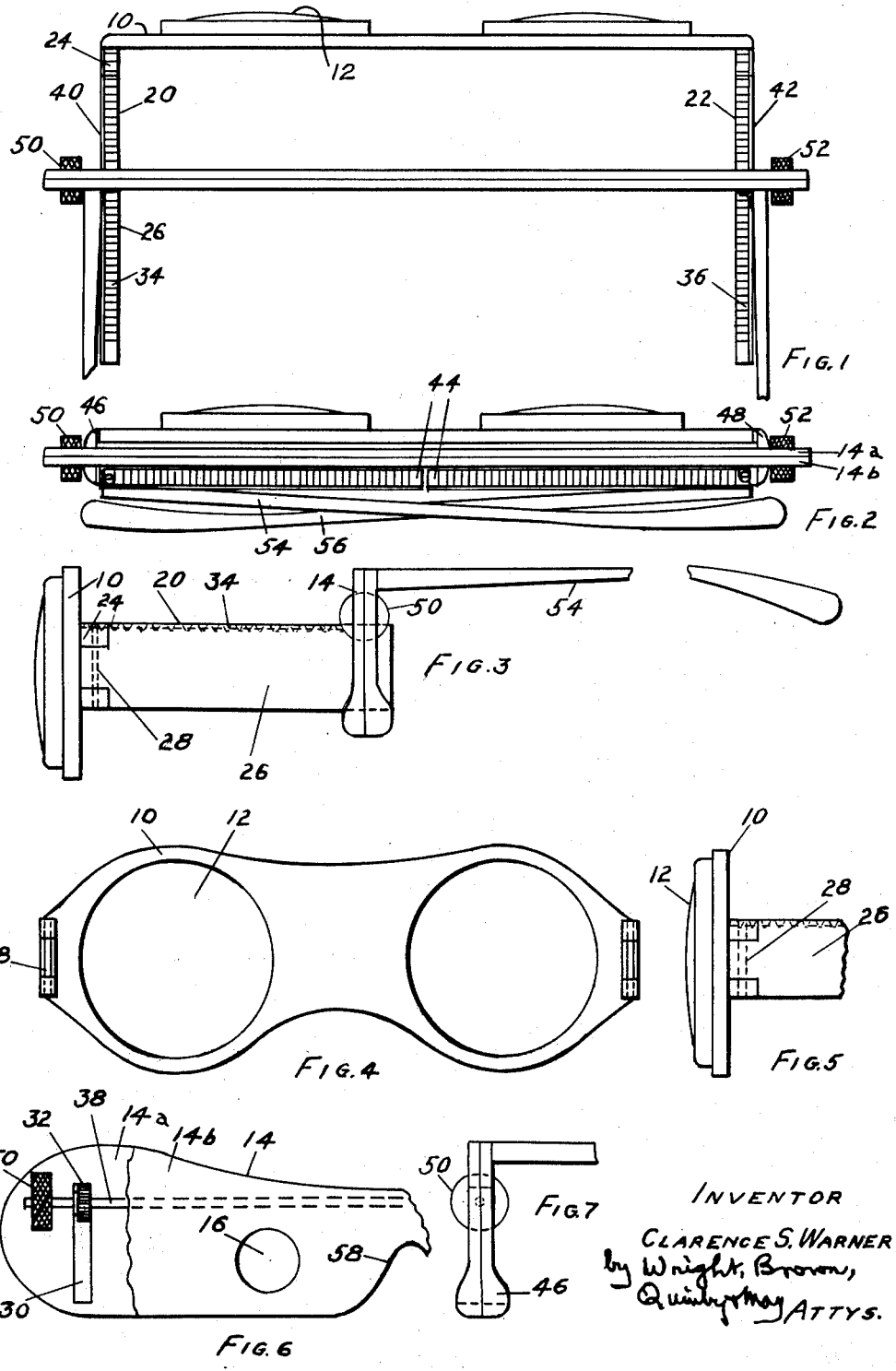

United States Patent Office 2,865,251
Patented Dec. 23, 1958

2,865,251

FOLDING OPERA GLASS SPECTACLES

Clarence S. Warner, Wellesley, Mass., assignor to C. S. Warner Corporation, Boston, Mass., a corporation of Massachusetts Application November 1, 1955, Serial No. 544,239

2 Claims. (Cl. 88—41)

This invention relates to an optical device which has the essential components of binocular opera glasses but which can be collapsed into a relatively flat form capable of being carried readily in a coat pocket. With the addition of spectacle bows or temples, the device can be worn on the nose when opened out for use.

According to the invention, front and rear frame members are provided, the former having objective lenses mounted therein the latter having ocular lenses mounted therein. In common with ordinary opera glasses the front and rear frame members are mechanically connected by means which keep them in parallel planes, the members being adjustably movable toward and from each other for focussing purposes. However, in this case the connecting means are collapsible so that the entire structure foldable into a flat package comparable to ordinary folded spectacles of the horn-trimmed type for stowage in a coat pocket.

For a more complete understanding of the invention, reference may be had to the following description thereof, and to the drawing of which—

Figure 1 is a fragmentary plan view of a device embodying the invention;

Figure 2 is a plan view of the same in its folded or collapsed condition;

Figure 3 is a side elevation of the device opened out as in Figure 1;

Figure 4 is a rear elevation of the front frame member;

Figure 5 is a side elevation of the front frame member and a portion of a guide bar hinged thereto;

Figure 6 is a fragmentary rear elevation of the rear frame member, a portion being broken away; and Figure 7 is a side elevation of the rear frame member and a portion of a temple hinged thereto.

The device consists essentially of a front frame member 10 in which are mounted one or two convex objective lenses 12, two lenses being shown on the drawing for binocular vision, a rear frame member 14 carrying one or two ocular lenses 16 of the concave type, and means mechanically connecting the front and rear frames in such a way as to permit adjustive movement toward and from each other while maintaining the frames in parallel planes with their lenses respectively aligned. For convenience in making and assembling the device, the rear frame member may be made in two parts 14a and 14b which are separately shaped and then permanently joined together.

In ordinary opera glasses the front and rear lens frames are connected by telescoping tubes. According to the present invention, one or more articulated guide bars are secured at one end to the front frame in such a way as to project rearwardly therefrom and at right angles to the plane thereof. In the embodiment of the invention illustrated on the drawing, two such guide bars 20 and 22 are shown. Each guide bar consists of two sections which are pivotally joined. For example, the bar 20 has a short section 24 rigidly secured to or integral with the frame member 10 so as to project from the rear face thereof at right angles to the plane of the member. The bar 20 also has a long section 26 attached to the short section 24, end to end, by suitable means such as a hinge pin 28. The bar 20 shown on the drawing has an oblong cross-sectional shape, the long dimension being vertical, and extends with a sliding fit through the lower portion of a rectangular slot 30 in the rear frame 14 near an end thereof. A similar slot (not shown) near the other end of the rear frame receives the guide bar 22. The rear frame member 14 is thus mechanically connected by the guide bars 20 and 22 to the front frame member 10 so that the lenses 16 are kept in alignment with the corresponding objective lenses 12 and are adjustably movable toward and from them.

To facilitate such adjustive movements, the upper edge of both sections of each of the guide bars 20 and 22 is provided with a rack or gear teeth which mesh with the teeth of a pinion rotatably mounted in the slot through which the guide bar extends. As shown, a pinion 32 is mounted in the upper part of the slot 30 to mesh with a rack 34 on the upper edge of the guide bar 20. In like member, a similar pinion (not shown) meshes with a rack 36 on the upper edge of the bar 22. The two pinions are fixed on a common horizontal shaft 38 which is embedded in the rear frame 14. The gear teeth on the racks and pinions are of uniform pitch so that the pinions as they rotate together keep the two frames 10 and 14 always in parallel planes. Preferably the teeth of the racks do not extend all the way across the upper edges of the guide bars 20 and 22. Instead, the outer margin of each guide bar is plane and on a level with the tops of the teeth of the adjacent rack. Thus the outer ends of the teeth of the rack 34 on the guide bar 20 abut or merge with a plane margin 40 which is on a level with the tops of the teeth and acts as a guard to prevent the ends of the teeth from catching on objects which may brush by the device when in use. A similar plane margin 42 is provided on the upper edge of the guide bar 22. At the rear end of each rack, a stop element is provided by filling in one or two grooves between rack teeth, as at 44. This prevents the rear frame member from coming off the ends of the guide bars.

To facilitate manual operation of the device, a knurled finger wheel 50 is fixed on the shaft 38 near an end thereof. Rotation of this wheel causes the pinions to rotate in unison and the rear frame to approach or recede from the front frame. If desired, a second finger wheel 52 may be mounted near the other end of the shaft 38 so that the device can be manipulated by either hand.

To prevent the rear frame member 14 from binding on the guide bars when the pinions are rotated, the rear frame member is locally thickened at the bottom of the slots 30, as at 46 and 48, to provide longer bearing surfaces for the bottom edges of the guide bars 20 and 22.

To collapse or fold the device for convenient stowage in a coat pocket or elsewhere, the rear frame 14 is moved forward until it is against the front frame 10. The short sections of the guide bars 20 and 22 are made just long enough to receive the rear frame. When the rear frame is against the front frame, the longer sections of the guide bars 20 and 22 are then entirely to the rear of the rear frame and are free to be swung on their pivots to positions parallel to the planes of the frames and against the rear face of the rear frame The overall thickness of the device comprising the parts thus far mentioned is approximately the sum to the thicknesses of the front and rear frames and one of the guide bars since the latter are preferably made so that the length of the long section is half the distance between the pivot axes of the hinge pins by which the long sections are attached to the respective short sections.

By the use of suitable materials, the device described may be made to be light in weight so that it can be worn in the manner of spectacles or eyeglasses. For this purpose suitable temples 54 and 56 may be hinged to the rear frame 14 in the customary manner, the rear frame being shaped to form a suitable arch 58 in its lower edge to rest on the bridge of the nose in the usual manner.

I claim:

1. A folding optical device comprising a front frame, a pair of objective lenses mounted in said frame, two guide bars each having a short section projecting rigidly from a respective end of said frame and at right angles thereto and a long section hinged to the short section and swingable between a position in alignment therewith and a position substantially parallel to the plane of said frame, a series of rack teeth on both sections of each said guide bar, a rear frame in a plane parallel to the front frame, said rear frame having two slots therethrough in which said guide bars are respectively slidable, a pinion mounted in each said slot in meshed engagement with the rack teeth on the corresponding guide bar, a shaft on which both pinions are fixed for simultaneous rotation, said pinions being in engagement with the rack teeth on said short sections when the front frame is adjacent to the rear frame and said long sections of the guide bars are folded to their positions parallel to the planes of the frames, and a pair of ocular lenses mounted in said rear frame and respectively aligned with the lenses in the front frame.

2. A folding optical device as described in claim 1, said rear frame having a nose rest, and pair of temples hinged to said rear frame.

References Cited in the file of this patent
UNITED STATES PATENTS

| 2,027,123 | Searles | Jan. 7, 1936 |

FOREIGN PATENTS

| 20,137 | Great Britain | of 1892 |
| 78,652 | Germany | Dec. 12, 1894 |